United States Patent Office 3,017,435
Patented Jan. 16, 1962

3,017,435
PREPARATION OF AMINES
Donald Drake Coffman, West Chester, Pa., and Edward Levant Jenner, Wilmington, Del., assignors to E. I. du Pont de Nemours and Company, Wilmington, Del., a corporation of Delaware
No Drawing. Filed June 20, 1956, Ser. No. 592,488
Claims priority, application Canada Jan. 28, 1953
11 Claims. (Cl. 260—583)

This invention relates to the preparation of organic amines and, more particularly, to a process for preparing organic amines, including diamines, from ethylenically unsaturated compounds.

This application is a continuation-in-part of applications Serial Nos. 275,686, filed March 8, 1952, and now abandoned and 354,876, filed May 13, 1953, and now abandoned.

Amines constitute a versatile and important class of organic compounds. They are useful for the preparation of derivatives such as amides or salts. Amines which contain a further functional group such as alkanolamines are also an extremely important class of compounds. Compounds containing two amine groups such as diamines have achieved importance in the preparation of condensation polymers such as nylon. Most synthetic routes to amines and particularly diamines include a number of reaction steps and leave considerable room for simplification and improvement. Moreover, diamines containing ethylenic unsaturation would have the advantage of conferring polymer properties different from those given by saturated diamines and also offer the possibility for subsequent modifying reactions involving the double bond. However, there has been no acceptable way of synthesizing diamines containing ethylenic unsaturation heretofore and, as a result, they have not come into use in the preparation of condensation polymers.

An object of the present invention is to provide a practical and economical method of preparing organic amines from ethylenically unsaturated compounds. A further object is to provide a method of preparing diamines from ethylenically unsaturated compounds. A still further object is to provide a method of preparing diamines containing ethylenic unsaturation from polymerizable ethylenically unsaturated compounds. Other objects will be apparent from the description of the invention given hereinafter.

The above objects are accomplished according to the present invention by reacting in liquid phase an ethylenically unsaturated compound with amino radicals and isolating the resulting amines. In a preferred embodiment, the amino radical, which can be substituted or unsubstituted, is generated in situ from the action of a metallic reducing ion on a hydroxylamino compound, the molar ratios or proportions being 1 to 10 of ethylenically unsaturated compound, 0.75 to 1.5 of metallic reducing ion, and 0.75 to 1.5 of hydroxylamino compound.

In a more specific and preferred form of the invention, an ethylenically unsaturated compound containing conjugated unsaturation is reacted in liquid phase in an aqueous medium with amino radicals generated in situ from the action of a metallic reducing ion on a hydroxylamino compound, which is in the form of an inorganic salt and in which any carbon directly attached to the nitrogen is aliphatic, the ethylenically unsaturated compound, metallic reducing ion and hydroxylamine salt being used in substantially molecularly equivalent quantities, and isolating the resultant diamine from the aqueous medium. Preferably, the ethylenically unsaturated compound contains only up to 8 carbon atoms. If a conjugated diene is employed, it has been found that the resulting diamine contains at least two ethylenic double bonds.

The present invention resides in major part in the discovery that ethylenically unsaturated compounds may be readily converted to amines by reacting with amino radicals generated in situ, the reaction being carried out in liquid phase and usually in an aqueous medium.

The invention is further illustrated by the following examples in which all proportions are by weight unless otherwise stated.

*Example I*

A reaction vessel was initially charged with 1170 parts of tert.-butyl alcohol, 1000 parts of water, 50 parts of sulfuric acid, and 34 parts of butadiene. The reaction vessel was blanketed with nitrogen throughout the course of the synthesis. While this mixture was vigorously agitated and held at a temperature of 0° C., the following three liquids were added simultaneously and equivalently over a 13-minute period: (1) a solution of 82 parts of hydroxylamine sulfate in 210 parts of water, (2) 108 parts of butadiene, and (3) an aqueous titanous sulfate solution containing 48 parts of titanium (III).

The titanium (III) solution was prepared by dissolving 1000 parts of titanyl sulfate (33.5% $TiO_2$ and 54.8% $H_2SO_4$) in a solution prepared from 148 parts of sulfuric acid and 1950 parts of water. This solution was passed through a Jones reductor (a column of amalgamated zinc). The solution thus obtained contained both titanous sulfate and zinc sulfate. The titanous sulfate solution used above was obtained by diluting 830 parts of this solution with 115 parts of water.

At the end of the addition period, an aqueous solution containing 100 parts of sodium hydroxide was added. The resulting mixture was filtered to remove the titanium (IV) compounds which had precipitated. The filtrate was concentrated by distillation, and the concentrate was again filtered to remove more precipitated titanium compounds. The filtrate was then treated with 240 parts of sodium hydroxide, whereupon the diamine formed a separate phase. The diamine comprised 10.1 parts.

A portion of the diamine was distilled, whereupon a fraction (B.P., 70–80° C./2 mm.) was collected. This is the expected boiling point for an 8-carbon diamine. The identity of the diamine as diaminooctadiene was confirmed by analysis.

| Anal. | Calcd. for $C_8H_{16}N_2$ | Found |
|---|---|---|
| Carbon | 68.52 | 66.55 |
| Hydrogen | 11.50 | 11.65 |
| Nitrogen | 19.98 | 19.18 |
| Neutral Equivalent | 70.1 | 74.5 |
| Hydrogenation Equivalent | 70.1 | 72.5 |

That the diamine was 1,8-diaminooctadiene was shown by its hydrogenation to octamethylenediamine.

*Example II*

A reaction vessel was charged with 300 parts of methanol, 112 parts of butadiene, 60 parts of sulfuric acid, and 200 parts of water. The mixture was maintained at −5° C. for 15 minutes during which period there were added simultaneously and equivalently 77 parts of titanium trichloride in 250 parts of water and 42 parts of N-methylhydroxylamine hydrochloride in about 75 parts of water. The product was isolated in the manner described in Example I. There was obtained a 39% yield of N,N'-dimethyldiaminooctadienes boiling at 77–93° C./4 mm. and having a neutral equivalent of 84.8 (calculated: 84).

*Example III*

The procedure of Example I was repeated except that isoprene was substituted for butadiene. There was obtained a 21% yield of diaminodecadiene boiling at 93–100° C./1 mm. with neutral equivalents of 83.1 and 86.4 (calculated: 84).

*Example IV*

To a vigorously stirred mixture of 500 parts of methanol, 300 parts of water, 130 parts of sulfuric acid, 105 parts of hydroxylamine hydrochloride, and 80 parts of cyclohexadiene maintained at 25° C., were added over a period of 9 minutes 335 parts of a titanium (III) chloride solution containing about 77 parts of titanium (III) chloride. At the end of the reaction time, excess cyclohexadiene was separated and the aqueous mixture treated with about 325 parts of 50% aqueous alkali. The titanium sulfate which separated, was removed by filtration, washed by slurrying with 1000 parts of hot water, and the filtrates combined, adjusted to pH to 3, and concentrated to a volume corresponding to 250 parts of water. Inorganic salts were removed by filtration and the filtrate was made alkaline by the addition of solid potassium hydroxide. The layer which separated, was dried with solid potassium hydroxide and dissolved in ether. The ether solution was dried with magnesium sulfate, concentrated, and the residue distilled. There were obtained 5.9 parts (12.3%) of a diamine fraction, B.P. 131–133° C./2 mm.

*Analysis.*—Calcd. for $C_{12}H_{20}N_2$: N, 14.6; C, 75.0; H, 10.42; Neut. Eq., 96.1. Found: N, 14.14; C, 74.52; H, 10.31; Neut. Eq., 96.2.

*Example V*

The procedure of Example IV was repeated except that 66 parts of cyclopentadiene were used in place of the cyclohexadiene. Reaction was carried out at 30° C. over a period of 10 minutes. These were obtained 8.8 parts (21.5%) of diamine, B.P. 96–98° C./1.1 mm.

*Analysis.*—Calcd. for $C_{10}H_{16}N_2$: C, 73.20; H, 9.75; N, 17.05; Neut. Eq., 82.1 Found: C. 72.57; H, 10.22; N, 17.63; Neut. Eq., 82.3.

*Example VI*

The procedure of Example IV was carried out using 126 parts of commercial mixed methylpentadienes in place of the cyclohexadiene. Crude distillation of the product gave 11.0 parts of material, B.P. 65–135° C. at 1.28 mm. Two rectifications through a small packed column gave fractions boiling between 90 and 102° C. at 6.9 mm.

*Analysis.*—Calcd. for $C_{12}H_{24}N_2$: C, 73.4; H, 12.3; N, 14.21; Neut. Eq., 98.1. Found: C, 72.12; H, 12.27; N, 13.60; Neut. Eq., 104.5.

*Example VII*

To a stirred mixture of 400 parts of methanol, 500 parts of water, 275 parts of amalgamated zinc, 100 parts of isoprene and 5 parts of titanyl sulfate were added simultaneously at 25° C. over a 30-minute period, 144 parts of sulfuric acid and 105 parts of hydroxylamine hydrochloride. The mixture began to reflux when about three-fourths of the materials had been added and boiling continued for forty minutes after the addition had been completed. To the resulting pink mixture was added 1360 parts of sodium hydroxide. The slurry obtained was extracted with four portions of 240 parts each of isopropyl alcohol. Concentration of the alcoholic solution gave a residue (about 33 parts) which was extracted with ether. Distillation of the ether-soluble portion gave an unsaturated diamine fraction of 2.9 parts boiling at 100–125° C./0.45 mm. with a neutral equivalent of 78 (calculated: 84).

*Example VIII*

To a vigorously stirred mixture of 500 parts of water, 400 parts of methanol, 36 parts of acetoneoxime, 136 parts of isoprene and 58 parts of sulfuric acid was added about 375 parts of a titanous chloride solution containing about 77 parts of titanium (III) chloride. The reaction was carried at the reflux temperature (31° C.) for a period of two hours. After adjusting the pH to 5 by addition of sodium hydroxide followed by the removal of titania by filtration, the liquid filtrate was concentrated to about 300 parts. Addition of sodium hydroxide resulted in the separation of an oil. This was extracted with propionitrile from which 5 parts of an oily amine, soluble in hydrochloric acid and insoluble in alkali, was obtained.

*Example IX*

A mixture of 880 parts of methanol, 200 parts of water, 77.0 parts of hydroxylamine hydrochloride, 50 parts of concentrated hydrochloric acid and 250 parts of trans-2-butene was placed in a pressure vessel equipped with a stirrer. Aqueous titanium (III) chloride (20% solution) was added portionwise over a period of 63 minutes until a total of about 155 parts of titanium trichloride had been added. During the addition of the titanium (III) chloride solution the reaction temperature was held at 20–30° C. The reaction was stopped 20 minutes after the titanium trichloride had been added.

Aqueous sodium hydroxide (40%) was added carefully whereupon a copious precipitate of titanium oxide formed at pH about 3.5. This precipitate was separated by centrifugation. The centrifugate was concentrated under reduced pressure and made strongly alkaline by adding about 1400 parts of 40% aqueous sodium hydroxide. The amines liberated were extracted with ether.

The ether extract was dried over anhydrous magnesium sulfate and distilled. An amine distilled with the ether; it was recovered by conversion to its hydrochloride, drying, and adding a small amount of 40% sodium hydroxide. The amine separated and 4.72 parts of 2-aminobutane (B.P. 62° C.; neutral eq. 72.5) was obtained on distillation (B.P. of 2-aminobutane reported in the literature is 63° C.; calculated neutral equivalent, 73).

Distillation of the higher-boiling products gave the following fractions:

| Fraction | B.P. (° C./mm.) | wt. (parts) | $n_D^{25}$ | Neutral Equivalent |
|---|---|---|---|---|
| 1 | 56/15 | 0.99 | 1.4472 | 100 |
| 2 | 86–90/15 | 1.24 | 1.4615 | 79 |
| 3 | 95/16 | 5.54 | 1.4630 | 75 |
| 4 | 95–100/16 | 1.17 | 1.4655 | 78 |
| Residue | | 3.6 | | 134 |

Redistillation of fractions 1, 2 and 3 through a precision still gave the following cuts:

| Cut | B.P. (° C./mm.) | wt. (parts) | Neutral Equivalent |
|---|---|---|---|
| 1 | 42–62/5 | 0.5 | 85.7 |
| 2 | 62–63.5/5 | 2.0 | 74.8 |
| 3 | 63.5/5 | 3.0 | 74.2 |
| 4 | 63.5/68/5 | 0.5 | 80.4 |
| Residue | | 0.3 | |

Cuts 2 and 3 proved to be an eight carbon diamine whose structure can be represented as

$H_2NCH(CH_3)CH(CH_3)CH(CH_3)CH(CH_3)NH_2$

| Analysis of Cut 3 | C | H | N | N.E. | Mol. Wt. |
|---|---|---|---|---|---|
| Calculated for $C_8H_{20}N_2$ | 66.7 | 13.9 | 19.4 | 72 | 144 |
| Found | 66.8 | 14.0 | 19.1 | 74.2 | 150 |

Reaction of Cut 3 with an equimolar amount of diphenyl dithiosebacate gave a fiber-forming polyamide.

In a repetition of this experiment but on a larger scale an amine distilling at 160–164° C. at atmospheric pressure corresponding to the structure

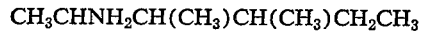

$CH_3CHNH_2CH(CH_3)CH(CH_3)CH_2CH_3$ was isolated in addition to the amines described above.

Example X

A mixture of 1733 parts of water, 67 parts of concentrated hydrochloric acid, 333 parts of ethylene and 308 parts of hydroxylamine hydrochloride was placed in a pressure vessel equipped with a stirrer. To this mixture was added portionwise an amount of 20% titanium (III) chloride solution equivalent in volume to 833 parts of water over a period of 54 minutes. The temperature was maintained at 25° C. by cooling.

The amines formed in this reaction were identified by means of paper chromatography. A solution of the amines used in this assay was obtained by mixing 110 parts of 40% sodium hydroxide and 79 parts of tert.-butyl alcohol with about 40 parts of the product and then separating the tert.-butyl alcohol layer which contained the amines. This amine solution was neutralized with 1.0 N HCl. It was applied to Whatman No. 1 paper and chromatographed by the procedure of Bremner and Kenten (J. Biochem. 49, 651–5 (1951)) using a mixture of n-butanol, acetic acid and water (5/1/1 by volume) as the solvent. Several distinct spots characteristic of amines were found on development with ninhydrin. Comparisons with known amines clearly showed that the amines formed in this reaction in substantial amounts included ethylamine, n-butylamine, ethylenediamine, and tetramethylenediamine. The total yield of these amines was 25% based on the titanous chloride.

Example XI

A 15% solution of titanium (III) chloride (corresponding in weight to a volume of 690 parts of water) was added portionwise at 22–26° C. over a period of 66 minutes to a well-stirred mixture of 880 parts of methanol, 200 parts of water, 77 parts of hydroxylamine hydrochloride, 50 parts of concentrated hydrochloric acid and 250 parts of ethylene in a pressure vessel. A 40% aqueous sodium hydroxide solution was added to the product to increase the pH to about 6.0. The copious precipitate of hydrated titanium oxide which formed was removed by centrifugation. The centrifugate was concentrated, made strongly alkaline by adding 2100 parts of 40% aqueous sodium hydroxide and extracted with ether. On distillation there was obtained the following fractions:

| Fraction | B.P., °C./mm. | Wt. (parts) | Neutral Equivalent | C | H | N |
|---|---|---|---|---|---|---|
| A | 78–79 | 1.2 | 73.5 | | | |
| B | 38/40–63/19 | 0.38 | 103.2 | | | |
| C | 63/19–76/19 | 1.1 | 118 | 64.33 | 13.59 | 14.78 |
| D | 76/19–98/19 | 1.13 | 104 | 64.35 | 13.36 | 15.80 |
| E | 98/19 | 0.5 | 75 | 65.16 | 13.97 | 19.12 |
| F | 98/19 | 0.25 | 81 | 65.17 | 13.83 | 19.50 |
| G | 88–112/11 | 1.2 | 91 | 68.99 | 14.0 | 15.88 |
| H | 112–118/11 | 1.5 | 84 | 67.98 | 13.86 | 17.48 |
| I | 106–111/4 | 0.5 | 98 | 69.86 | 13.91 | 14.52 |
| J | 90/1.5 | 1.3 | 100 | 71.53 | 14.02 | 14.63 |
| Residue | | 7.5 | | | | |

Fraction A was identified as n-butylamine. A derivative formed with phenyl isothiocyanate melted at 64° C. (literature, 64° C.); the melting point was not depressed on mixing this derivative with an authentic sample.

Fraction B, on redistillation, boiled at 128–130° C. and was shown to be n-hexylamine (neutral equivalent 102—calculated for n-hexylamine 101; M.P. of phenyl isothiocyanate derivative, 75–76° C.—no depression on mixed melting point with an authentic sample—literature value, 77° C.).

Fractions C and D were combined and mixed with water. The water-insoluble fraction distilled at 178–180° C. This was n-octylamine (literature B.P. 179.6° C.; N analysis. Found: 10.74; calc. for $C_8H_{19}N$; 10.84).

Fraction H was largely octamethylenediamine based on infrared analysis, paper chromatography, boiling point and elemental analyses.

The remaining fractions contained diamines, as indicated by their nitrogen contents and boiling points.

Example XII

A mixture of 240 parts of vanadyl sulfate ($VOSO_4 \cdot 2H_2O$), 700 parts of water and about 46 parts of concentrated sulfuric acid was hydrogenated at 40–50° C. using platinum catalyst. This yielded about 780 parts of vanadium (III) salt solution containing the equivalent of about 51 parts of vanadium calculated as the metal. This solution was added portionwise over a period of 28 minutes to a well-stirred mixture of 1300 parts of water, 116 parts of hydroxylamine hydrochloride, 100 parts of concentrated hydrochloric acid and 250 parts of ethylene in a pressure vessel.

The amines obtained in this reaction were isolated by concentrating the reaction product and adding 1400 parts of 40% sodium hydroxide. The resultant basic solution was heated slowly to 100° C. and ethylamine (2.5 parts, B.P. 16° C.) and n-butylamine (9.4 parts, B.P. 78–79° C.) distilled. The undistilled residue was exhaustively extracted with tert.-butyl alcohol. This extract on distillation yielded 23.3 parts of ethanolamine (B.P. 84° C./24–25 mm.; neutral equivalent; found, 60.3, calculated: 61) and 16.4 g. of 4-amino-1-butanol (B.P. 113° C./24–25 mm. and 204° C. at atm. pressure—compared to literature of B.P. 206°/776; neutral equivalent; found, 88.5, calculated 89, N: found, 15.9%, calculated: 15.7%). There was about 6 parts of amine containing residue. The total yield of amine containing products was about 81% based on the vanadium (III).

Example XIII

Butadiene was bubbled into a solution (about 90 parts) that contained about 7 parts of titanium trichloride and about 3.3 of hydrochloric acid (calculated as hydrogen chloride). Over a period of 17 minutes about 32 parts of a solution containing about 5.4 parts of hydroxylamine sulfate was added dropwise to the reaction medium. Butadiene gas was introduced for an additional 15 minutes. Analysis of the reaction mixture showed a 45% yield of ammonia and a 41% yield of primary amine product based on hydroxylamine.

When the above general procedure was repeated except that vanadium (III) ion was used as the reducing ion, the yield of primary amine product was increased to 93% with only a 6% yield of ammonia. Substitution of sulfuric acid for hydrochloric acid gave substantially the same results. The use of sulfuric acid of lower concentration (0.15 molar instead of 1.0 molar) gave higher yield of ammonia (36%) with less primary amine product.

Example XIV

To a solution of 4.3 parts of allyl alcohol, about 32 parts of 11.7% aqueous solution of sulfuric acid, and 10 parts of an aqueous solution containing 0.695 parts of hydroxylamine hydrochloride was added under nitrogen over a period of five minutes, about 25 parts of an aqueous solution containing 9.3 parts of titanium (III) sulfate solution. After stirring this mixture for 10 minutes, the unreacted titanous sulfate was titrated with standard ferric chloride solution. About 0.9 mole of titanous sulfate was consumed for each mole of hydroxylamine used, indicating that a large fraction of the amino radicals had reacted with the allyl alcohol. Kjeldahl analysis for ammonia showed that only 11% of the hydroxylamine was converted to ammonia and thus about 89% of the hydroxylamine was converted to amine. A product obtained by repetition of this general procedure except on a larger scale gave an amine which had the following analysis: C, 53.51; H, 8.88; N, 3.11.

Example XV

About 430 parts of titanium (III) chloride solution containing about 98 parts of the trichloride (prepared by reacting titanium metal with concentrated hydrochloric acid) was added dropwise over a period of 12 minutes at room temperature to a well-stirred mixture of 1100 parts of water, 70 parts of hydroxylamine hydrochloride, 86 parts of crotonic acid and 50 parts of concentrated hydrochloric acid. Analyses of the product for ammonia indicated that 48.8% of the amino radicals theoretically obtainable had added to the double bonds of crotonic acid.

The titanium was removed as titanium hydroxide by adding enough sodium hydroxide solution to raise the pH to about 3.8 and then centrifuging. The centrifugate was evaporated to dryness and the resultant solid extracted with boiling methanol. This extraction yielded 52 parts of a viscous semi-solid material. This material was dissolved in n-butanol; subsequent addition of ether caused a precipitate (9.0 parts) to form. Analysis of the precipitate by infrared showed that it was largely an amino acid hydrochloride. Elemental analysis indicated that the main constituent of this precipitate was a reaction product involving one amino radical for each crotonic acid molecule.

*Analysis.*—Found: Cl, 28.6; N, 13.01. Calcd. for HCl·H₂N(CH₃CH=CHCO₂H)H: Cl, 25.63; N, 10.01.

The material that remained in solution after treatment with ether was isolated by evaporation of the solvent. Seventeen parts of a viscous liquid was obtained. Infrared analysis showed it to be an amino acid hydrochloride. Elemental analysis indicated that it was largely material resulting from the reaction of one amino radical with two crotonic acid molecules.

*Analysis.*—Found: C, 44.63; H, 8.35; Cl, 16.9; N, 8.67. Calcd. for

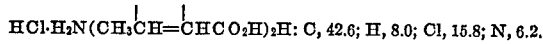

HCl·H₂N(CH₃CH=CHCO₂H)₂H: C, 42.6; H, 8.0; Cl, 15.8; N, 6.2.

*Example XVI*

When the general process of Example XV was repeated except that sorbic acid was employed in the place of crotonic acid, an amino-containing acid was obtained.

The above examples are merely illustrative and the invention is broadly applicable to the preparation of amines from ethylenically unsaturated compounds. Simple aliphatic monoolefins such as ethylene, propylene, isobutylene, butene-1, butene-2, cyclohexene, cyclopentene, and similar monoethylenically unsaturated compounds can be used in the instant process. The monoethylenically unsaturated compounds generally give lower quantities of diamines than of monoamino-containing organic compounds. Ethylenically unsaturated compounds containing not more than 8 carbons are generally more available and enter into the reaction better than higher ethylenically unsaturated compounds. Diolefins, e.g., allene and butadiene, are also useful. Compounds that contain conjugated unsaturation generally give a higher yield of diamines. Of such compounds, dienes which have two conjugated ethylenic groups are particularly suitable as they react readily and yield diamines containing two or more isolated unsaturated linkages. The readily available and preferred dienes are those of 4 to 6 carbons, inclusive. These include butadiene, isoprene, cyclopentadiene, the methylpentadienes, and cyclohexadiene. Of the latter, the hydrocarbon dienes of 4 and 5 carbons are preferred.

Although the use of actinic light on ammonia produces amino radicals, the preferred process involves production of the amino radicals by the action of a metallic reducing ion on a hydroxylamino compound. Suitable metallic reducing ions include Ti⁺³, V⁺², V⁺³, Cr⁺², and Mo⁺³. In general, the optimum speed of reaction is attained when the titanium (III) ion is present, although vanadium (III) gives high yields. Accordingly, reducing ions of groups IV-B and V-B of the periodic table (Fisher 1951) are preferred. It is not necessary that all of the metallic reducing ion be of one variety. The metallic reducing ion itself may be generated in situ, e.g., as shown in Example VII wherein titanous ion is obtained during the reaction by the use of amalgamated zinc. The anion present with the metallic reducing cation is immaterial as long as it is stable to amino radicals, i.e., not oxidized by or reacts with amino radicals. Suitable anions include the sulfate, chloride, and nitrate.

The term hydroxylamino compound as used herein includes the specific compound, hydroxylamine, those hydroylamines wherein any carbon directly attached to the nitrogen is aliphatic, and aldoximes and ketoximes. Of these hydroxylamino compounds, the hydroylamines and ketoximes are preferred for reasons of availability and reactivity.

The hydroxylamino compound may be introduced into the reaction as the amino compound itself, e.g., hydroxylamine, as the free base, or as an acid salt thereof, such as the hydrochloride, nitrate or sulfate, i.e., salts of acids of pKa of not more than 2. The acid should be one whose anions are not reactive with amino radicals. O-acyl derivatives such as hydroxylamine O-sulfonic acid, can also be used. N-alkyl and N-alkylaryl hydroxylamines, such as N-ethylhydroxylamine, N,N-dimethylhydroxylamine, and N,N-dibenzylhydroxylamine can be employed. Preferred, for reasons of availability and operative convenience, are the hydroxylamino compounds of the formula:

wherein R and R' are hydrogen, hydrocarbon radicals wherein any carbon directly attached to the nitrogen is aliphatic, or R and R' together form a divalent organic radical as in acetone ketoxime, cyclohexanone ketoxime, or butyraldehyde aldoxime, and X is hydrogen or an inorganic salt forming group. Particularly useful are compounds in which R and R' are hydrogen or alkyl radicals of up to 2 carbons each.

It will be apparent that the particular amino radical generated in situ will depend directly on the hydroxylamino compound used in the reaction and the particular amine obtained by the reaction will, in turn, depend on the amino radical and the ethylenically unsaturated compound used. Thus, the diamines formed by the instant reaction, are represented by the general formula:

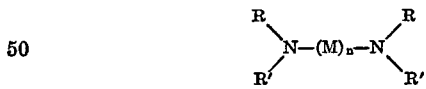

wherein M is the unit of the ethylenically unsaturated compound, such as butadiene (C₄H₆), n is an integer of generally up to 3 and preferably 2, and R and R' are hydrogen or hydrocarbon radicals as initially present in the hydroxylamino compound.

Aqueous reaction systems are conveniently employed in carrying out the reaction of this invention because of the high solubility of the metallic reducing ions in aqueous media. Mixed solvents such as combinations of water with alcohols, esters, and ethers facilitate the solution of the organic reactants. The pH of the reaction medium will depend chiefly upon the metallic reducing ions used and will typically be less than 7. In certain uses, it is advantageous to maintain it at less than 2.

Normally, the quantity of the hydroxylamino compound and of the metallic reducing ion will be substantially molecularly equivalent to the quantity of the ethylenically unsaturated compound employed. However, this can be varied considerably from mole ratios of from 1 to 10 of ethylenically unsaturated compounds, 0.75 to 1.5 of metallic reducing ion, and 0.75 to 1.5 of hydroxylamino compound. The metallic reducing ion should be added either substantially simultaneously with the hydroxylamino compound or after the addition of the hydroxylamino compound.

The optimum reaction temperature is dependent upon the particular system and will generally vary from −30° C. to 100° C. but it is not critical. Atmospheric pressure will normally be employed although other pressures can be used. The reaction time is not a critical factor but it may be limited to some extent by the necessity of dissipating the heat liberated by the exothermic reaction. The amine radicals react substantially as soon as they are formed.

The amines obtained by this synthesis are generally isolated by an extraction or distillation technique or by a combination of both. The filtration of the reaction mixture at some point may be beneficial by effecting the removal of inorganic salts. The advisability of this step depends on the particular inorganic salt employed.

The products obtained by the process of this invention are useful in themselves, or as intermediates, such as in the preparation of polymers, for example, by reaction of the diamines or alkanolamines with dibasic acids to give polyamides. The unsaturated diamines, obtained when conjugated dienes are employed as the unsaturated component, may either be utilized directly in the synthesis of polyamides or they may be hydrogenated to the corresponding saturated diamines before condensation with the dibasic acids. The amines available from this process are also useful in the preparation of other organic compounds. Those products which contain ethylenic unsaturation may be subjected to further reactions at these points as, for example, halogenation and oxidation to give valuable products.

As many apparently widely different embodiments of this invention may be made without departing from the spirit and scope thereof, it is to be understood that the invention is not limited to the specific embodiments thereof except as defined in the appended claims.

The invention claimed is:

1. The process, for introducing an amino radical into the hydrocarbon group of a compound containing up to and including 8 carbon atoms and having 1 to 2 ethylenic double bonds, said compound being a member of the group consisting of aliphatic hydrocarbons and monosubstituted aliphatic hydrocarbons, the substituent on the substituted hydrocarbon being a member of the group consisting of hydroxyl and carboxyl radicals, which comprises reacting in an organic solvent/water medium at −30° to +100° C. said compound with amino radicals generated in situ by the action of a metallic reducing ion of a metal of atomic number 22 to 24 on a hydroxylamino compound having the formula

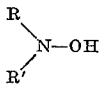

wherein R and R′ are members of the group consisting of hydrogen and saturated aliphatic hydrocarbon radicals having a total of up to and including 4 carbon atoms, the molar ratios being 1 to 10 of said compound, 0.75 to 1.5 of said metallic reducing ion, and 0.75 to 1.5 of said hydroxylamino compound.

2. The process, for introducing an amino radical into the hydrocarbon group of a compound containing up to and including 8 carbon atoms and having 1 to 2 ethylenic double bonds, said compound being a member of the group consisting of aliphatic hydrocarbons and monosubstituted aliphatic hydrocarbons, the substituent on the substituted hydrocarbon being a member of the group consisting of hydroxyl and carboxyl radicals, which comprises reacting in an alcohol/water medium at −30° to +100° C. said compound with amino radicals generated in situ by the action of a metallic reducing ion of a metal of atomic number 22 to 24 on a hydroxylamino compound having the formula

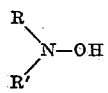

wherein R and R′ are members of the group consisting of hydrogen and saturated aliphatic hydrocarbon radicals having a total of up to and including 4 carbon atoms, the molar ratios being 1 to 10 of said compound, 0.75 to 1.5 of said metallic reducing ion, and 0.75 to 1.5 of said hydroxylamino compound.

3. The process for introducing an amino radical into the hydrocarbon group of a compound containing up to and including 8 carbon atoms and having 1 to 2 ethylenic double bonds, said compound being a member of the group consisting of aliphatic hydrocarbons and monosubstituted aliphatic hydrocarbons, the substituent on the substituted hydrocarbon being a member of the group consisting of hydroxyl and carboxyl radicals, which comprises reacting in liquid phase at −30° to +100° C. said compound with amino radicals generated in situ by the action of a metallic reducing ion of a metal of atomic number 22 to 24 on a hydroxylamino compound having the formula

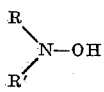

wherein R and R′ are members of the group consisting of hydrogen and saturated aliphatic hydrocarbon radicals having a total of up to and including 4 carbon atoms, the molar ratios being 1 to 10 of said compound, 0.75 to 1.5 of said metallic reducing ion, and 0.75 to 1.5 of said hydroxylamino compound.

4. The process for introducing an amino radical into the hydrocarbon group of a compound having up to and including 8 carbon atoms and 1 to 2 ethylenic double bonds, said compounds being members of the group consisting of aliphatic hydrocarbon and monosubstituted aliphatic hydrocarbons, the substituent on the substituted hydrocarbon being a member of the group consisting of hydroxyl and carboxyl radicals, which comprises reacting in an aqueous medium at −30° to +100° C. said compound with amino radicals generated in situ by the action of a metallic reducing ion of a metal of atomic number 22 to 24 on a hydroxylamino compound having the formula

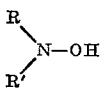

wherein R and R′ are members of the group consisting of hydrogen and saturated aliphatic hydrocarbon radicals having a total of up to and including 4 carbon atoms, said hydroxylamino compound being in the form of a salt of an inorganic acid of pKa of not more than 2, said compound, said metallic reducing ion and said hydroxylamine salt being used in substantially molecularly equivalent quantities.

5. The process for introducing an amino radical into a ethylenically unsaturated hydrocarbon having up to and including 8 carbon atoms and containing up to 2 ethylenic double bonds, which comprises reacting at −30 to +100° C. said hydrocarbon with amino radicals generated in situ in an aqueous medium by the action of a metallic reducing ion selected from the group consisting of $Ti^{+3}$, $V^{+2}$, $V^{+3}$, $Cr^{+2}$ and $Mo^{+3}$ on a hydroxylamino compound having the formula

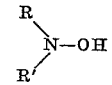

wherein R and R′ are members of the group consisting of hydrogen and saturated aliphatic hydrocarbon radicals having a total of up to and including 4 carbon atoms, said hydroxylamino compound being in the form of an inorganic salt, the inorganic acid of which has a pKa of not more than 2, the molar ratios being 1 to 10 of said hydrocarbon 0.75 to 1.5 of said metallic reducing ion, and 0.75 to 1.5 of said hydroxylamine salt.

6. The process as defined in claim 5 wherein said hydrocarbon is a conjugated diene of 4 to 6 carbon atoms, said diene, said metallic reducing ion and said hydroxylamine salt being added to the aqueous system simultaneously and equivalently on a molecular basis to generate the amino radicals.

7. The process as defined in claim 5 wherein said hydrocarbon is a conjugated diene of 4 to 6 carbon atoms and said hydrocarbon, said metallic reducing ion and said hydroxylamine salt are used in substantially molecularly equivalent quantities.

8. The process as defined in claim 5 wherein said hydrocarbon is a conjugated diene of 4 to 5 carbon atoms and said hydrocarbon, said metallic reducing ion and said hydroxylamine salt are used in substantially molecularly equivalent quantities.

9. A process which comprises maintaining in liquid phase an aqueous reaction mixture of a lower molecular weight aliphatic hydrocarbon conjugated diolefin and an inert aliphatic alcohol solvent for said diolefin, and in said mixture reacting hydroxylamine, titanous chloride and said diolefin, in substantially molecularly equivalent quantities, to produce a reaction product comprising a diamino dimer of said diolefin.

10. The process which comprises reacting butadiene with amino radicals in an aqueous medium at $-30°$ to $+100°$ C. to form diaminooctadiene, said amino radicals being generated in situ by the action of a metallic reducing ion from the group consisting of $Ti^{+3}$, $V^{+2}$, $V^{+3}$, $Cr^{+2}$ and $Mo^{+3}$ on hydroxylamine in the form of a salt of an inorganic acid of pKa of not more than 2 thereof, the molar ratios being 1 to 10 of said butadiene, 0.75 to 1.5 of said metallic reducing ion and 0.75 to 1.5 of said hydroxylamine salt.

11. The process which comprises reacting butadiene with amino radicals in a water/tert. butyl alcohol medium at $-30°$ to $+100°$ C. to form diaminooctadiene, said amino radicals being generated in situ by the action of titanous sulfate on hydroxylamine sulfate, and said butadiene, said titanous sulfate and said hydroxylamine sulfate being used in substantially molecularly equivalent quantities.

References Cited in the file of this patent
UNITED STATES PATENTS
2,567,109　　Howard ---------------- Sept. 4, 1951

OTHER REFERENCES

Davis et al.: J. Chem. Soc., pages 2563–2567, vol. III (1951).